(12) United States Patent
Wakamatsu et al.

(10) Patent No.: US 9,527,381 B2
(45) Date of Patent: Dec. 27, 2016

(54) FUEL FILLER LID DEVICE

(71) Applicant: MITSUBISHI JIDOSHA KOGYO KABUSHIKI KAISHA, Tokyo (JP)

(72) Inventors: Atsushi Wakamatsu, Okazaki (JP); Yutaka Fujiwara, Okazaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 95 days.

(21) Appl. No.: 14/574,508

(22) Filed: Dec. 18, 2014

(65) Prior Publication Data
US 2015/0183316 A1 Jul. 2, 2015

(30) Foreign Application Priority Data

Dec. 26, 2013 (JP) .................. 2013-269972
Dec. 26, 2013 (JP) .................. 2013-269973
Dec. 26, 2013 (JP) .................. 2013-269974

(51) Int. Cl.
B60K 15/05 (2006.01)

(52) U.S. Cl.
CPC ......... B60K 15/05 (2013.01); *B60K 2015/053* (2013.01); *B60K 2015/0546* (2013.01); *B60K 2015/0576* (2013.01); *B60K 2015/0584* (2013.01)

(58) Field of Classification Search
CPC ...... B60K 15/05; B60R 25/10; B60R 25/1001
USPC ..................................... 296/97.22; 340/425.5
See application file for complete search history.

(56) References Cited

U.S. PATENT DOCUMENTS 5,080,421 A * 1/1992 Otowa ............ B60K 15/03504
123/519

FOREIGN PATENT DOCUMENTS

JP 4082263 B2 4/2008

* cited by examiner

*Primary Examiner* — Jason S Daniels
(74) *Attorney, Agent, or Firm* — Birch, Stewart, Kolasch & Birch, LLP

(57) ABSTRACT

A fuel filler lid device is capable of protrusion and movement and has a door hook which locks a fuel filler lid in a closed state by being urged in an extending direction by a spring and unlocks the fuel filler lid by being contracted/operated by a door motor. A wall portion that regulates extension of the door hook at a first position in a state locked by the door hook at a closed position is provided on the fuel filler lid. If a sensor detects that the door hook is at the first position for a predetermined time, it is determined that the fuel filler lid is in the closed state, while the sensor detects that the door hook is at a second position protruding more than the first position for a predetermined time, it is determined that the fuel filler lid is in an open state.

16 Claims, 11 Drawing Sheets

FUEL FILLER LID DEVICE

BACKGROUND OF THE INVENTION

Field of the Invention

The present invention relates to a fuel filler lid device and in more detail, relates to an opened/closed state detection portion of a fuel filler lid.

Description of the Related Art

In a prior-art fuel storing device mounted on a vehicle and the like, as a technology for preventing emission of a fuel evaporative gas evaporated in a fuel tank into the atmosphere, a canister communicating with the fuel tank and a sealing valve controlled so as to seal the fuel tank are provided in a path having the fuel tank and the canister communicate with each other, and the sealing valve is opened in fueling so that the fuel evaporative gas flows out toward the canister and the fuel evaporative gas is adsorbed by the canister.

If the fuel tank is sealed by the sealing valve as in this fuel storing device, the fuel in the fuel tank evaporates with a rise of an outside air temperature, and a pressure in the fuel tank might become high due to the fuel evaporative gas. Moreover, there is a concern that the fuel evaporative gas is emitted into the atmosphere with opening of a lid of a fuel filler of the fuel tank in fueling.

Thus, in order to prevent emission of the fuel evaporative gas into the atmosphere involved in fueling, a fuel filler lid device which can lock the fuel filler lid covering a fuel filler of the fuel tank in the closed state is provided, and when an opening operation of the fuel filler lid is performed by a switch or the like, the sealing valve is opened before the fuel filler lid is unlocked so that the fuel evaporative gas is made to flow out and the pressure in the fuel tank is sufficiently lowered (see Japanese Patent No. 4082263).

Vehicles of a type having a fuel filler lid include those having an opening/closing sensor for detecting opened/closed state of the fuel filler lid. For example, at a time other than fueling such as during vehicle running, if an open state of the fuel filler lid is detected, an alarm prompting closing of the fuel filler lid is performed.

Then, as in the above-described Patent Literature 1, in the fuel filler lid device which can lock an opened/closed state of the fuel filler lid, it is desired that detection of both the open state and a closed state of the fuel filler lid can be made with a compact configuration with a smaller number of components.

Moreover, in the fuel filler lid device as in the above-described Patent Literature 1, an actuator for unlocking the fuel filler lid is provided.

In the fuel filler lid device having the actuator and the opening/closing sensor as above, it is desired that a failure of the actuator, abnormality such that the fuel filler lid is stuck or the like can be detected with a simple configuration.

Moreover, in order to handle a situation in which the actuator for unlocking the fuel filler lid fails and the fuel filler lid cannot be brought into the open state, there is a device provided with an emergency lever (forced unlocking portion) which can manually unlock the fuel filler lid.

However, in the fuel filler lid device having the sensor for detecting the opened/closed state of the fuel filler lid as above, if the fuel filler lid is unlocked manually by the emergency lever, there is a concern that the opened/closed state of the fuel filler lid cannot be detected normally and an unnecessary alarm or the like is given.

SUMMARY OF THE INVENTION

Thus, an object of the present invention is to provide a fuel filler lid device which can detect various opened/closed states or abnormality of the fuel filler lid with a compact configuration with a smaller number of components.

In order to achieve the above-described object, the fuel filler lid device according to the invention of the present application has a configuration provided with a fuel filler lid for opening/closing a fuel filler of a fuel tank of a vehicle, a locking portion provided on a vehicle body and movable in a direction to protrude to a side of the fuel filler lid from the vehicle body, a movable portion for making the locking portion movable, a regulation portion provided on the fuel filler lid and regulating a protrusion position of the locking portion at a first position with the fuel filler lid at a closed position, a detection portion for detecting the protrusion position of the locking portion, and a determination portion for determining that the fuel filler lid is in a closed state if the detection portion detects that the locking portion is at the first position for a predetermined time and for determining that the fuel filler lid is in the open state if it is detected that the locking portion is at a second position protruding more than the first position for a predetermined time.

As a result, if the locking portion is at the first position, it can be determined that the fuel filler lid is locked by the locking portion and that the fuel filler lid is in the closed state. Moreover, if the locking portion is at the second position protruding more than the first position, extension of the filler lid is not regulated by the regulation portion, and thus, it can be determined that the fuel filler lid is not locked by the locking portion. Therefore, if the detection portion detects that the locking portion is at the first position for a predetermined time, it can be determined that the fuel filler lid is in the closed state, while if it is detected that the locking portion is at the second position for a predetermined time, it can be determined that the fuel filler lid is in the open state and thus, both the open state and the closed state of the fuel filler lid can be detected by one detection portion.

Moreover, since the detection portion detects the protrusion position of the locking portion, locking of the lid and the open/closed state of the fuel filler lid can be detected altogether, and thus, there is no need to provide a new sensor or the like at the fuel filler lid portion and an increase in a cost can be suppressed by a compact configuration.

Moreover, the fuel filler lid device according to the invention of the present application is configured to include the fuel filler lid for opening/closing the fuel filler of the fuel tank of the vehicle, the locking portion provided on the vehicle body and capable of protrusion and movement, the movable portion for making the locking portion movable, the regulation portion provided on the fuel filler lid and for regulating the protrusion position of the locking portion provided with the fuel filler lid at the closed position and for locking it at the closed position, an unlock control portion for unlocking the fuel filler lid by operating the movable portion by an operation of an unlock operation portion and by moving the locking portion in a counter-protrusion direction from the first position, a detection portion for detecting a position of the locking portion, and an abnormality determination portion making abnormality determination on the basis of a change of a detection result of the detection portion after the operation of the unlock operation portion is performed.

As a result, if the fuel filler lid device is normal, by means of movement of the locking portion in the counter-protrusion direction from the first position by operation of the unlock operation portion, the detection result of the detection portion changes, and the fuel filler lid is unlocked.

Then, if the change of the detection result of the detection portion is different from that in a normal state, the abnormality determination portion can determine that unlocking of the fuel filler lid is abnormal since movement of the locking portion is prevented, and the abnormality of the fuel filler lid device can be detected with a simple configuration.

Moreover, the fuel filler lid device according to the invention of the present application is configured to include the fuel filler lid for opening/closing the fuel filler of the fuel tank of the vehicle, the locking portion provided on the vehicle body and movable in the direction protruding from the vehicle body, a forced unlock portion for unlocking the fuel filler lid by forcedly moving the locking portion manually, the detection portion for detecting the position of the locking portion and outputting the detection result, and a forced unlock determination portion for determining that the fuel filler lid is unlocked by the forced unlock portion on the basis of an output time of an output from the detection portion.

As a result, if the output time of the output from the detection portion is largely different from the output time at normal time, it can be determined that the fuel filler lid is unlocked by the forced unlock portion. Since the detection portion detects the position of the locking portion, it can be used for detection of the open/closed state of the fuel filler lid, and unlock of the fuel filler lid by the forced unlock portion can be detected with a simple configuration by sharing the detection portion.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

A fuel filler lid device 70 of the present invention will be explained below on the basis of the attached drawings.

Figure 1:
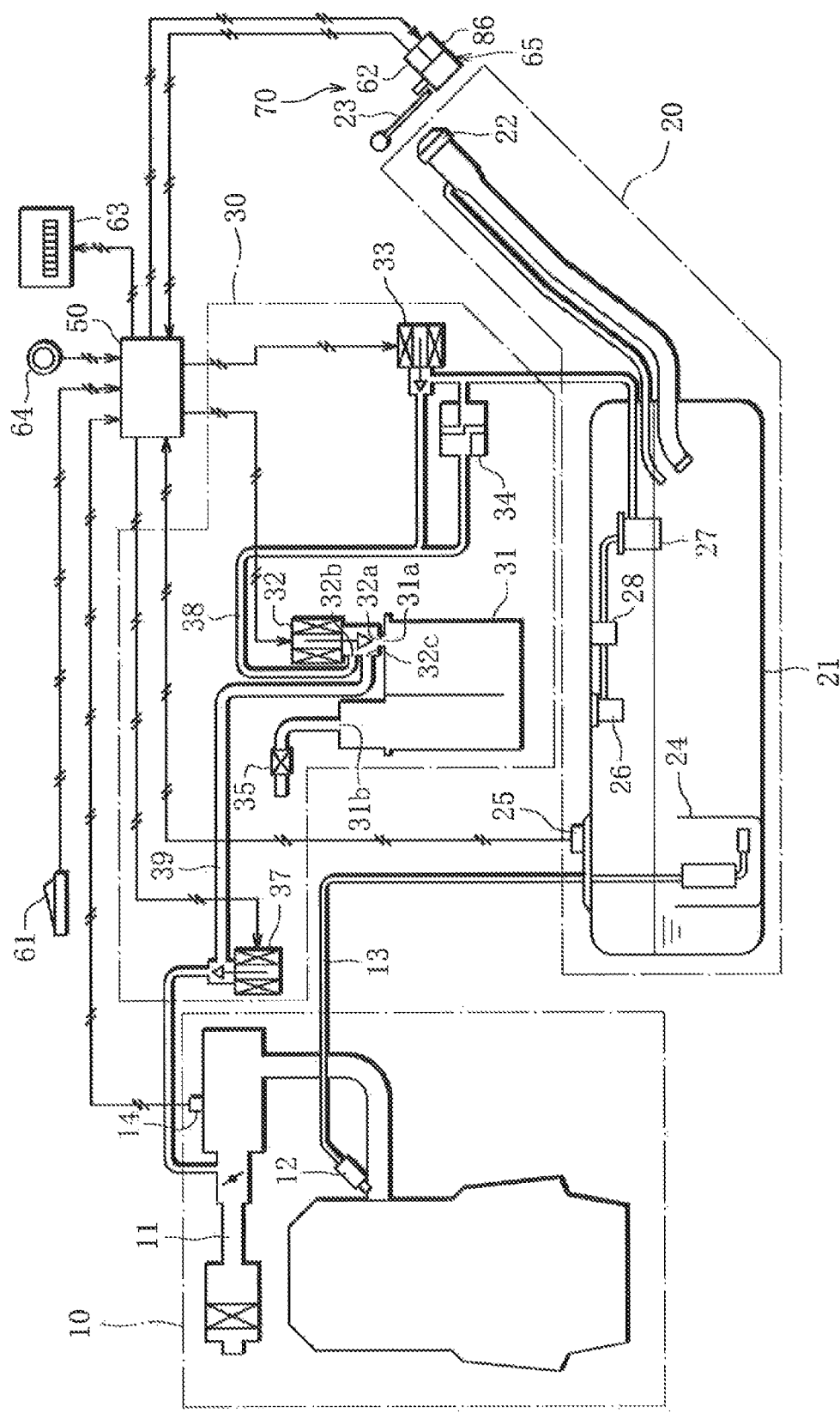
FIG. 1 is an outline configuration diagram of a fuel storing device of a vehicle provided with a fuel filler lid device according to the present invention.

FIG. 1 is an outline configuration diagram of a fuel storing device of a vehicle provided with the fuel filler lid device 70 according to the present invention.

As illustrated in FIG. 1, the fuel storing device according to this embodiment roughly includes an engine (internal combustion engine) 10 mounted on a vehicle, a fuel storing portion 20 storing a fuel, a fuel evaporative gas treatment portion 30 for treating a fuel evaporative gas which is an evaporative gas of the fuel evaporated in the fuel storing portion 20, an electronic control unit (hereinafter referred to as an ECU) (a determination portion, an unlock control portion, an abnormality determination portion, a forced unlock determination portion, an alarm regulation portion) 50 which is a controller for comprehensive control of the vehicle, a fuel filler lid 23 which is a lid of a fuel filler 22 provided on a vehicle body of the vehicle, a momentary operation type fuel filler lid switch 61 (an unlock operation portion) for operating an opening operation of the fuel filler lid 23, a door opening/closing sensor 62 (a detection portion) for detecting opening/closing of the fuel filler lid 23, a display 63 (alarm portion) for displaying a vehicle state and the like, a momentary operation type main switch 64 for connecting/disconnecting a main power supply of the vehicle, and a lid lock mechanism 65 for locking the fuel filler lid 23 in a closed state.

The engine 10 is a gasoline engine of an intake passage injection type (Multi Point Injection: MPI). In the engine 10, an intake passage 11 for taking in air into a combustion chamber of the engine 10 is provided. In the intake passage 11, an intake pressure sensor 14 for detecting an internal pressure of the intake passage 11 is provided. On a downstream of the intake passage 11, a fuel injection valve 12 for injecting a fuel into an intake port of the engine 10 is provided. To the fuel injection valve 12, a fuel pipeline 13 is connected, and the fuel is supplied.

The fuel storing portion 20 has a fuel tank 21 for storing the fuel, the fuel filler 22 which is a fuel inlet into the fuel tank 21, a fuel pump 24 for supplying the fuel from the fuel tank 21 to the fuel injection valve 12 through the fuel pipeline 13, a pressure sensor 25 for detecting an internal pressure of the fuel tank 21, and a float valve, not shown, therein, a fuel cut-off valve 26 for preventing outflow of the fuel from the fuel tank 21 to a fuel evaporative gas treatment portion 30 by an action of the float valve, a leveling valve 27 for controlling a liquid level in the fuel tank 21 in fueling, and an orifice having an inner diameter (ϕ1.0 mm, for example) smaller than an inner diameter of a vapor pipeline 38, a purge pipeline 39 and the like which will be described later are provided, and the fuel storing portion 20 is constituted by a 2-way valve 28 for limiting fueling when the fuel tank 21 is in a full tank state with the fuel, that is, a fueling amount in refueling and a fuel amount detecting device for detecting a fuel amount in the fuel tank 21, not shown. Moreover, the fuel evaporative gas generated in the fuel tank 21 is discharged to an outside of the fuel tank 21 from a lower part of the leveling valve 27 or to the outside of the fuel tank 21 through the 2-way valve 28 and the leveling valve 27 by the fuel cut-off valve 26.

The fuel evaporative gas treatment portion 30 is constituted by a canister 31, a bypass valve 32, a sealing valve 33, a safety valve 34, an air filter 35, a purge valve 37, the vapor pipeline 38, and the purge pipeline 39.

The canister 31 has an active coal therein. Moreover, in the canister 31, an evaporative gas communication hole 31a through which a fuel evaporative gas generated in the fuel tank 21 or the fuel evaporative gas adsorbed by the active coal flows is provided. Moreover, in the canister 31, an outside air intake hole 31b for taking in outside air when the fuel evaporative gas adsorbed by the active coal is to be emitted is provided. Moreover, the outside air intake hole 31b is connected so as to communicate with the other side of the air filter 35 with one side opened to the atmosphere for preventing intrusion of rubbish from an outside.

In the bypass valve 32, a canister connection port 32a connected so as to communicate with the evaporative gas communication hole 31a of the canister 31 is provided. Moreover, in the bypass valve 32, a vapor pipeline connection port 32b to which the other end of the vapor pipeline 38 is connected so as to communicate therewith, with one end connected so as to communicate with the leveling valve 27 of the fuel tank 21 and a purge pipeline connection port 32c to which the other end of the purge pipeline 39 is connected so as to communicate therewith, with one end thereof connected so as to communicate with the intake passage 11 of the engine 10 are provided. The vapor pipeline connection port 32b and the purge pipeline connection port 32c of the bypass valve 32 are connected to the vapor pipeline 38 and the purge pipeline 39, respectively. Moreover, the bypass valve 32 is a normally open type electromagnetic valve opened in a non-conducted state and brought into a valve closed state when a driving signal is supplied from the outside and a conducted state is brought about. The bypass valve 32 allows the canister connection port 32a, the vapor pipeline connection port 32b, and the purge pipeline connection port 32c to communicate with each other in a non-conducted state and in a valve open state so that inflow/outflow of the fuel evaporative gas into/out of the canister 31 and inflow of the atmosphere taken in by the air filter 35 into the vapor pipeline 38 and the purge pipeline 39 are made possible. Moreover, when the driving signal is supplied from the outside and in the conducted state and the valve closed state, the canister connection port 32a is closed, and the bypass valve 32 allows only the vapor pipeline connection port 32b and the purge pipeline connection port 32c to communicate, and inflow/outflow of the fuel evaporative gas into/out of the canister 31 and inflow of the atmosphere into the vapor pipeline 38 and the purge pipeline 39 from the air filter 35 are made impossible. That is, the bypass valve 32 closes the canister 31 in the valve closed state and opens the canister 31 in the valve open state.

The sealing valve 33 is interposed in the vapor pipeline 38. Moreover, the sealing valve 33 is of a normally closed type electromagnetic valve closed in the non-conducted state and opened when the driving signal is supplied from the outside and brought into the conducted state. The sealing valve 33 closes the vapor pipeline 38 in the non-conducted state and in the valve closed state and opens the vapor pipeline 38 if the driving signal is supplied from the outside and the conducted state and the valve open state are brought about. That is, the sealing valve 33 closes the fuel tank 21 into the sealed state in the valve closed state and makes outflow of the fuel evaporative gas generated in the fuel tank 21 to the outside of the fuel tank 21 impossible, while in the valve open state, it makes outflow of the fuel evaporative gas into the canister 31 possible.

The safety valve 34 is interposed in the vapor pipeline 38 in parallel with the sealing valve 33. The safety valve 34 is opened when an internal pressure of the fuel tank 21 rises so as to prevent burst of the fuel tank 21 by relieving the pressure to the canister 31.

The purge valve 37 is interposed in the purge pipeline 39 between the intake passage 11 of the engine 10 and the bypass valve 32. Moreover, the purge valve 37 is a normally closed type electromagnetic valve closed in the non-conducted state and opened when the driving signal is supplied from the outside and brought into the conducted state. The purge valve 37 closes the purge pipeline 39 in the non-conducted state and in the valve closed state and opens the purge pipeline 39 when the driving signal is supplied from the outside and in the conducted state and in the valve open state. That is, the purge valve 37 makes outflow of the fuel evaporative gas from the fuel evaporative gas treatment portion 30 to the engine 10 impossible in the valve closed state and makes outflow of the fuel evaporative gas to the engine 10 possible in the valve open state.

The display 63 is to display a vehicle state and displays time from the operation of the fuel filler lid switch 61 to unlocking of the fuel filler lid 23, stop of the opening operation of the fuel filler lid 23, the open/closed state of the fuel filler lid 23 and the like, for example.

The ECU 50 is constituted by including an input/output device, a storage device (a ROM, a RAM, a nonvolatile RAM and the like), a central processing unit (CPU), a timer and the like.

To an input side of the ECU 50, the intake pressure sensor 14, the pressure sensor 25, the fuel filler lid switch 61, the door opening/closing sensor 62, and the main switch 64 are connected, and detection information from these sensors is inputted.

On the other hand, to an output side of the ECU 50, the fuel injection valve 12, the fuel pump 24, the bypass valve 32, the sealing valve 33, the purge valve 37, the display 63, and a door motor 86 (an actuator, a movable portion) provided in the lid lock mechanism 65 are connected.

The ECU 50 controls the operation of the fuel filler lid 23, opening/closing of the bypass valve 32, the sealing valve 33, and the purge valve 37, pressure in the fuel tank 21 and in the vapor pipeline 38 and the purge pipeline 39 between the sealing valve 33 and the purge valve 37, and adsorption of the fuel evaporative gas by the canister 31 and a flow of the fuel evaporative gas such as outflow of the fuel evaporative gas adsorbed by the canister 31 to the intake passage 11 of the engine 10 and the like on the basis of detection information from various sensors.

Particularly, the ECU 50 unlocks the fuel filler lid 23 by operating the door motor 86 when the fuel filler lid switch 61 is operated so as to open the fuel filler lid 23, but if the pressure in the fuel tank 21 detected by the pressure sensor 25 at this time is higher than the atmospheric pressure by a predetermined value or more, the ECU 50 opens the sealing valve 33 so as to allow the fuel evaporative gas in the fuel tank 21 to flow out to the canister 31 and to lower the pressure to a predetermined value or less close to the atmospheric pressure and then, operates the door motor 86 so as to unlock and operates to open the fuel filler lid 23.

Subsequently, the fuel filler lid device 70 according to the present invention will be explained.

Figure 2:
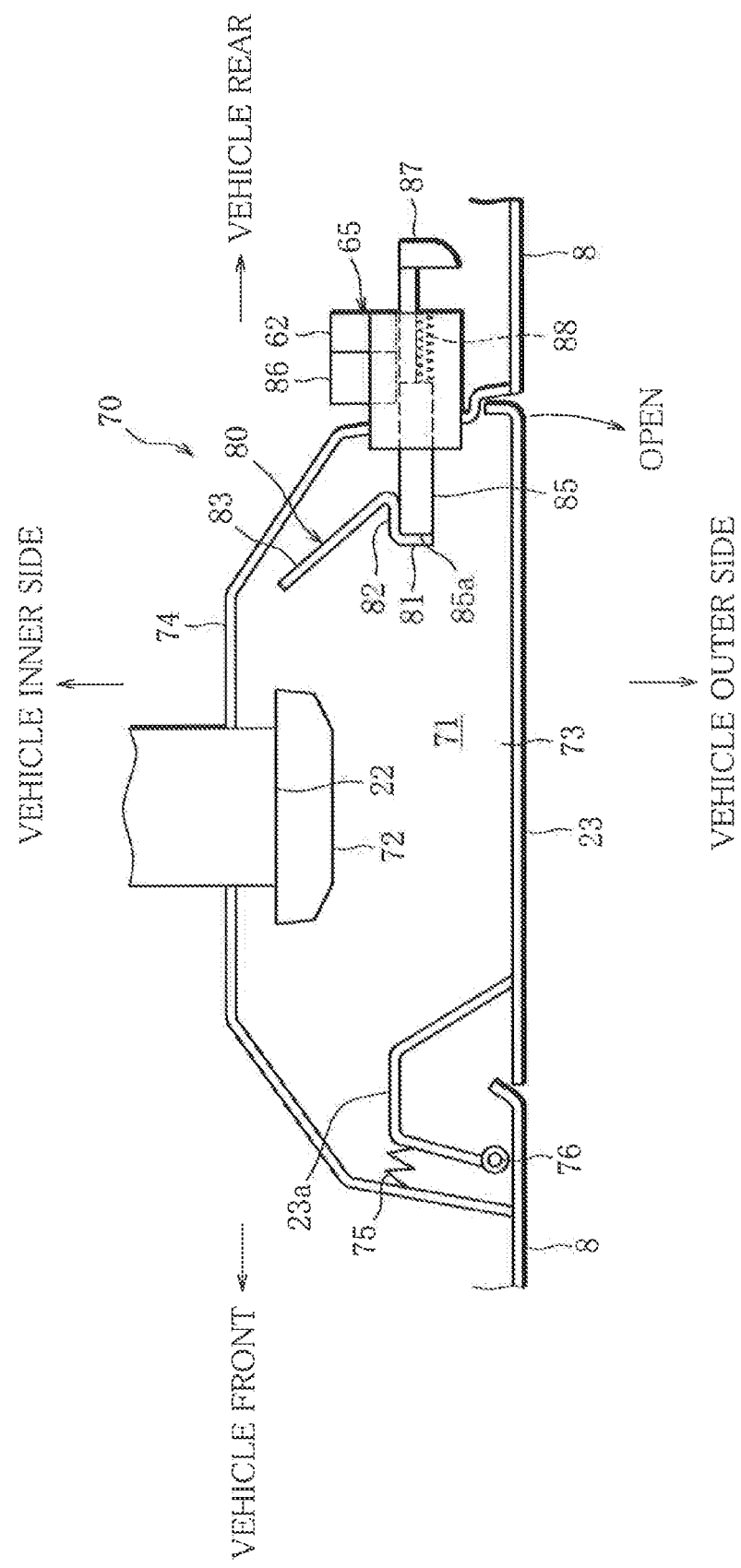
FIG. 2 is a cross sectional view illustrating a structure of the fuel filler lid device according to an embodiment of the present invention.

FIG. 2 is a cross sectional view illustrating a structure of the fuel filler lid device 70 according to the embodiment of the present invention.

As illustrated in FIG. 2, the fuel filler lid device 70 of this embodiment includes the fuel filler lid 23 which is a lid for accommodating the fuel filler 22 provided on the vehicle body of the vehicle, the above-described lid lock mechanism 65, and the door opening/closing sensor 62.

The fuel filler 22 is arranged so as to protrude in an accommodating chamber 71 provided on a rear fender 8 of the vehicle. The fuel filler 22 is normally closed by a fuel cap 72 fastened capable of being released, connects a nozzle of a fuel filling gun when being opened so as to enable fueling.

The accommodating chamber 71 is provided inside an opening portion 73 provided on the rear fender 8. The accommodating chamber 71 is formed by being surrounded by a housing shaped accommodating housing 74 and a lid-plate shaped fuel filler lid 23 closing the opening portion 73 capable of being opened.

The fuel filler lid 23 is rotatably supported by a rotary shaft 76 inside the rear fender 8 and extending in a vertical direction of the vehicle through a rotary shaft bracket 23a. Moreover, a spring 75 (first urging portion) is provided between the rotary shaft bracket 23a and the accommodating housing 74, and the spring 75 is provided so as to urge the fuel filler lid 23 in an open direction at a closed position where the fuel filler lid 23 closes the opening portion 73.

On the fuel filler lid 23, a door bracket 80 (bracket) formed by bending a flat plate is fixed to a rear part thereof. The door bracket 80 is arranged so as to be located in the accommodating chamber 71 when the fuel filler lid 23 is closed and has a left-and-right wall portion 81 (a regulation portion, a bent portion) substantially perpendicular to a direction in which the fuel filler lid 23 extends on a cross section, a front-and-rear wall portion 82 (a bent portion) extending substantially in parallel with a direction in which the fuel filler lid 23 extends by bending perpendicularly rearward from an inner side end portion of the left-and-right wall portion 81, and a diagonal wall portion 83 bending by approximately 45 degrees from a rear end of the front-and-rear wall portion 82 and extending inward and forward.

The lid lock mechanism 65 is provided on a rear side of the accommodating housing 74. The lid lock mechanism 65 includes a rod-shaped door hook 85 (a locking portion) supported movably in a vehicle longitudinal direction, the above-described door motor 86 for moving the door hook 85 in the vehicle longitudinal direction, and an emergency lever 87 capable of forcedly moving the door hook 85 manually in the longitudinal direction. The door opening/closing sensor 62 is constituted integrally with the lid lock mechanism 65 and can detect a moved position (protrusion position) of the door hook 85.

The door hook 85 of the lid lock mechanism 65 is urged by a hook return spring 88 (a second urging portion, a movable portion) to the vehicle front side (the fuel filler lid 23 side) and extends toward the vehicle front side and is configured such that a distal end 85a protrudes into the accommodating chamber 71. By conducting the door motor 86 (ON), the door hook 85 moves toward a vehicle rear side against the urging of the hook return spring 88.

When the fuel filler lid 23 is closed, positions of the door bracket 80 and the door hook 85 are set so that a side surface of the door hook 85 protruding to the vehicle front side is located substantially without a gap along an outer side surface of the front-and-rear wall portion 82 of the door bracket 80. Therefore, at this time, the front-and-rear wall portion 82 of the door bracket 80 is brought into contact with the side surface of the door hook 85, and opening movement of the fuel filler lid 23 is regulated. Moreover, when the fuel filler lid 23 is closed, conduction to the door motor 86 is turned OFF, and the distal end 85a of the door hook 85 is urged by the hook return spring 88 so as to protrude toward the vehicle front side, but by being brought into contact with a rear surface of the left-and-right wall portion 81 of the door bracket 80, the protrusion amount of the door hook 85 is set to be regulated at an intermediate position (first position).

On the other hand, if the door motor 86 is conducted and the door hook 85 is contracted/operated, a length in the longitudinal direction of the door bracket 80 and a movable position of the door hook 85 are set so that the distal end 85a of the door hook 85 is moved rearward from the rear end of the front-and-rear wall portion 82.

Figure 3:
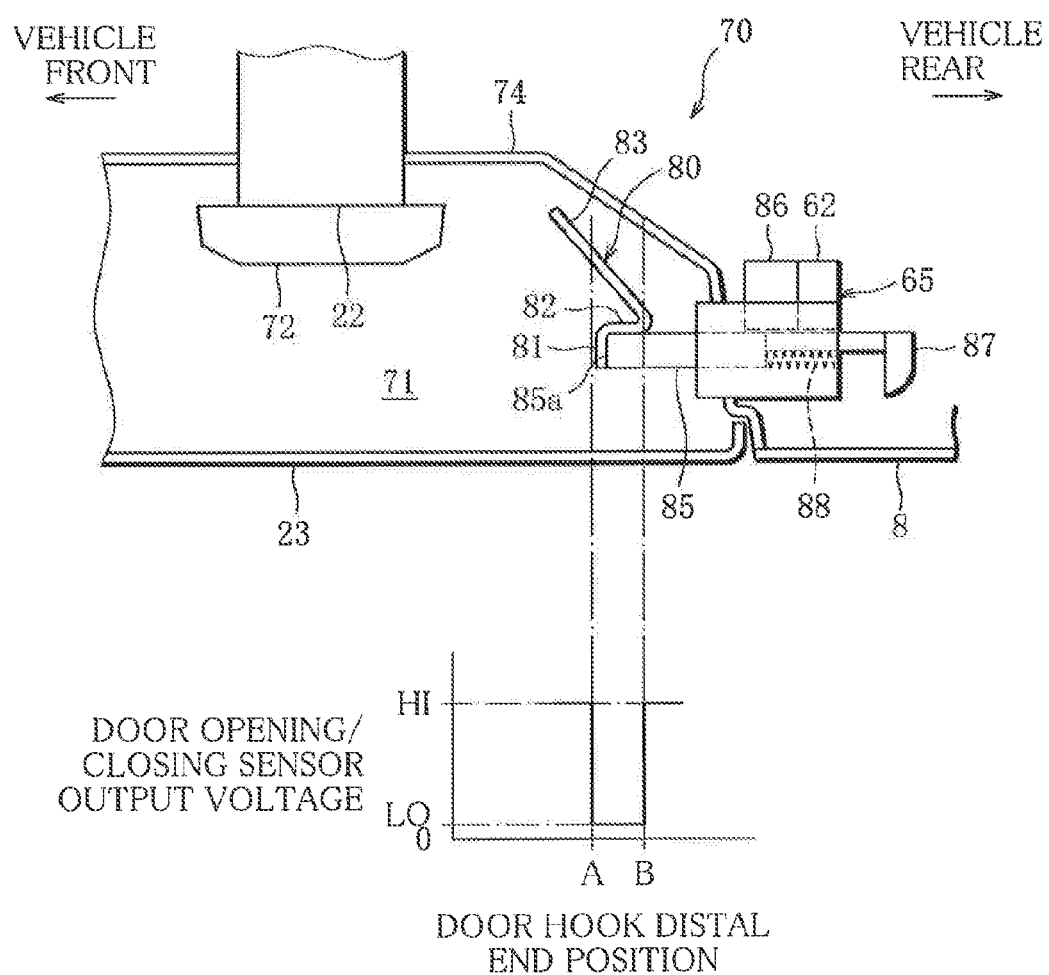
FIG. 3 is an explanatory view illustrating a relationship between a position of a door hook and an output of a door opening/closing sensor.

FIG. 3 is an explanatory view illustrating a relationship between a position of the door hook 85 and an output signal of the door opening/closing sensor 62.

As illustrated in FIG. 3, the door opening/closing sensor 62 can output two types of outputs, that is, a high voltage Hi (a second output or a battery voltage, for example) and a low voltage Lo (a first output or a value somewhat larger than 0, for example).

The door opening/closing sensor 62 outputs the high voltage Hi when the distal end 85a of the door hook 85 is located closer to the vehicle front than a position A, using the position A somewhat front of the left-and-right wall portion 81 of the door bracket 80 in the closed state and a position B somewhat front of the rear end of the front-and-rear wall portion 82 as references, outputs the low voltage Lo between (first position) the position A and the position B and outputs the high voltage Hi when it is located on the vehicle rear from the position B (third position). The door opening/closing sensor 62 may have an output 0 instead of the low voltage Lo but by setting the low voltage Lo, disconnection can be detected if the output is 0. Moreover, the high voltage Hi and the low voltage Lo may be vice versa, but power consumption can be lowered by setting the output in the closed state of the fuel filler lid 23 which is a normal time, that is, between the position A and the position B at the low voltage Lo.

Figure 4:
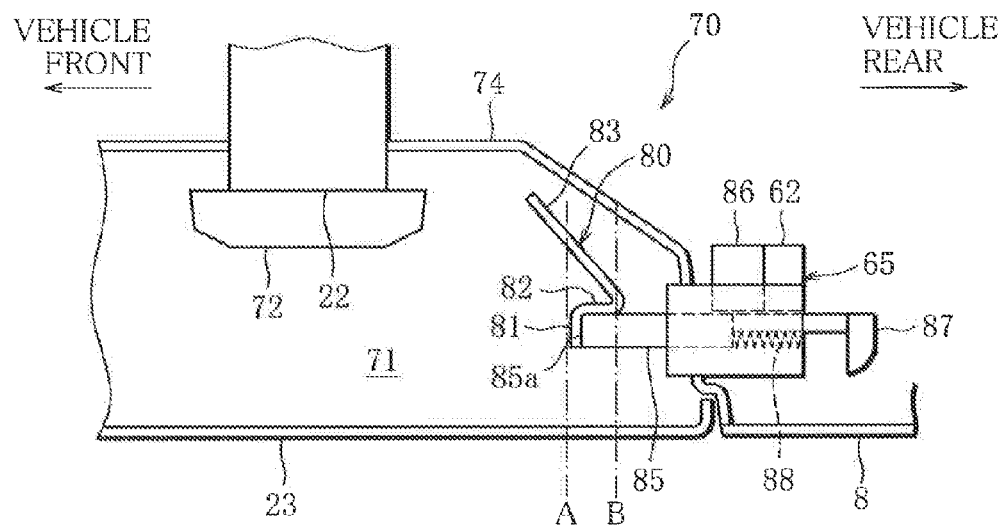
FIG. 4 is an explanatory view illustrating a moved state of the door hook in a fully closed state of a fuel filler lid.
Figure 5:
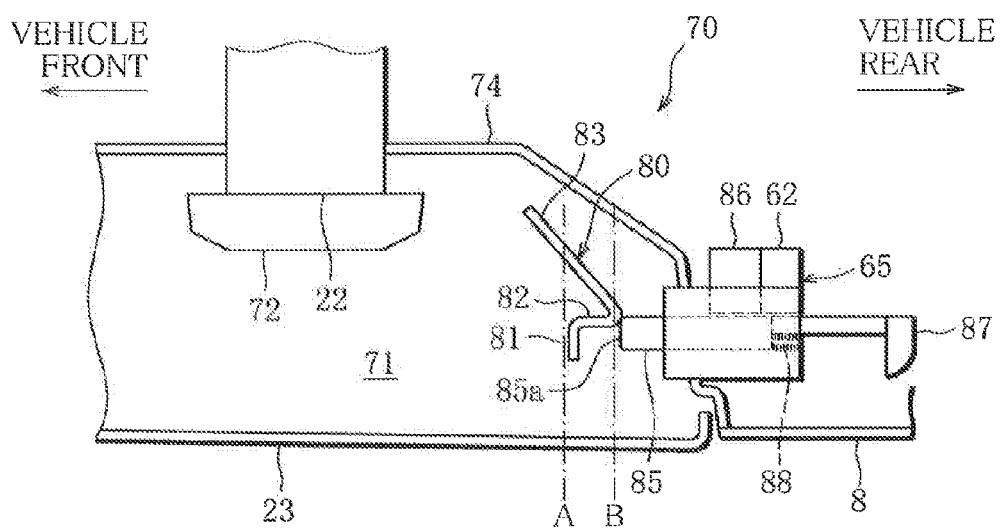
FIG. 5 is an explanatory view illustrating the moved state of the door hook in a switching state from closed to open of the fuel filler lid.
Figure 6:
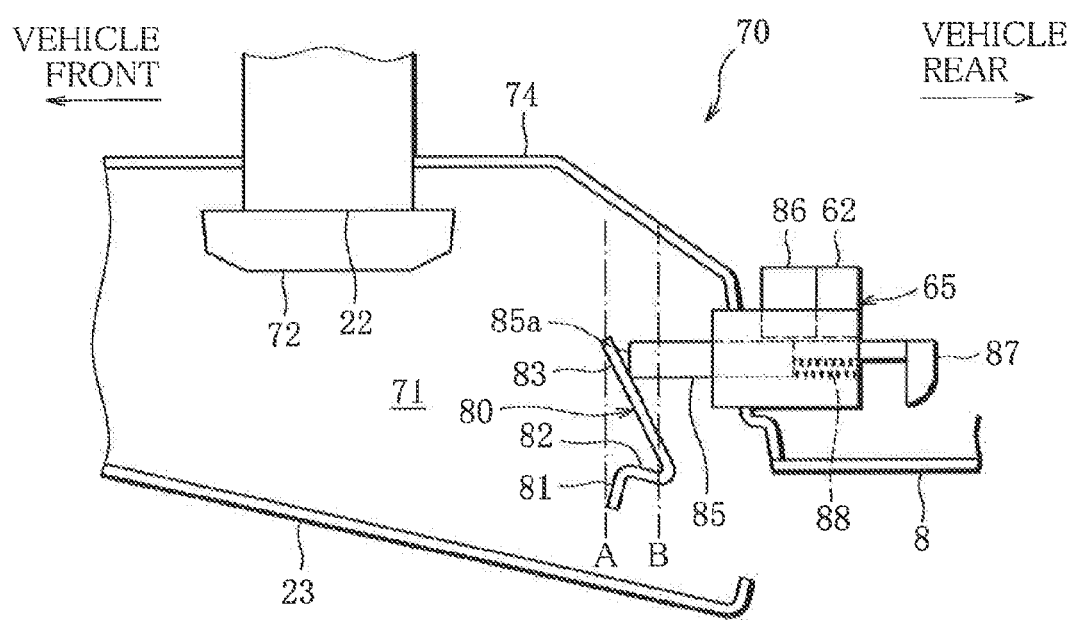
FIG. 6 is an explanatory view illustrating the moved state of the door hook during an opening operation of the fuel filler lid.
Figure 7:
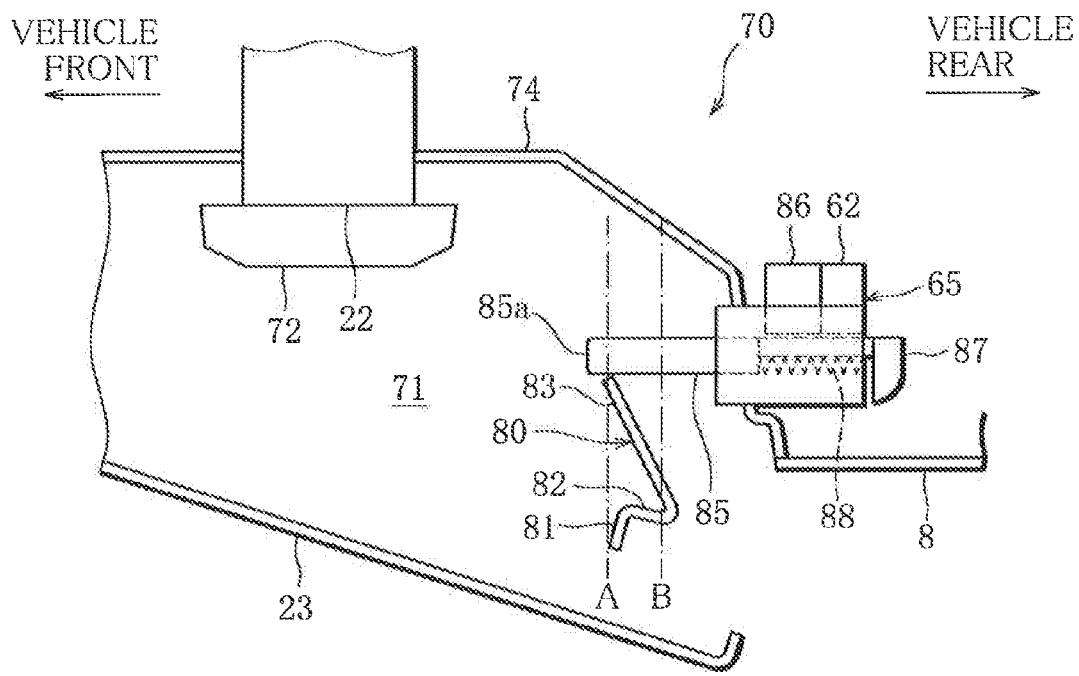
FIG. 7 is an explanatory view illustrating the moved state of the door hook in an open state of the fuel filler lid.

FIGS. 4 to 7 are explanatory views illustrating a relationship between open/closed states of the fuel filler lid 23 and a moved state of the door hook 85, in which FIG. 4 illustrates the closed state of the fuel filler lid 23, FIG. 5 for a switched state from closed to open of the fuel filler lid 23 (when the door motor 86 is ON), FIG. 6 for the opening operation of the fuel filler lid 23, and FIG. 7 for the open state of the fuel filler lid 23.

As illustrated in FIG. 4, when the door motor 86 is OFF, the door hook 85 protrudes to the vehicle front side by the hook return spring 88, but in the closed state of the fuel filler lid 23, the distal end 85a of the door hook 85 is brought into contact with the left-and-right wall portion 81 of the door bracket 80, and the protrusion amount is regulated. At this time, the distal end 85*a* of the door hook 85 is located at the first position between the position A and the position B, and thus, the output of the door opening/closing sensor 62 becomes the low voltage Lo. Then, the ECU 50 determines that the fuel filler lid 23 is in the closed state from the door motor 86 is OFF and the output of the door opening/closing sensor 62 being the low voltage Lo. Moreover, if the fuel filler lid 23 is in the closed state, the output of the door opening/closing sensor 62 maintains the low voltage Lo, and thus, the ECU 50 determines that the fuel filler lid 23 is in the closed state if the output of the door opening/closing sensor 62 keeps the low voltage Lo for a predetermined time.

As illustrated in FIG. 5, if the door motor 86 is turned ON in order to unlock the fuel filler lid 23 and the distal end 85*a* of the door hook 85 moves to the vehicle rear side to the vicinity of the rear end portion of the front-and-rear wall portion 82 of the door bracket 80, the distal end 85*a* of the door hook 85 comes closer to the vehicle rear side than the position B, and the output of the door opening/closing sensor 62 becomes the high voltage Hi. Therefore, the ECU 50 determines that it is during the switching operation from closed to open of the fuel filler lid 23 from the door motor 86 ON and the door opening/closing sensor 62 Hi.

If the door motor 86 is kept ON for a predetermined time (a certain period of time) and the distal end 85*a* of the door hook 85 moves closer to the vehicle rear than the rear end of the front-and-rear wall portion 82 of the door bracket 80, lock of the door bracket 80 by the door hook 85 is unlocked, and the fuel filler lid 23 starts to open by the spring 75. Then, as illustrated in FIG. 6, the distal end 85*a* of the door hook 85 moves to the vehicle front with open movement of the fuel filler lid 23 while the distal end 85*a* of the door hook 85 is in contact with the diagonal wall portion 83 of the door bracket 80, and the distal end 85*a* of the door hook 85 is located at the first position between the position A and the position B, and the output of the door opening/closing sensor 62 becomes the low voltage Lo. At this time, the door motor 86 is OFF, and the ECU 50 determines that the fuel filler lid 23 is during the opening operation from the door motor 86 OFF and the output of the door opening/closing sensor 62 being the low voltage Lo.

As illustrated in FIG. 7, when the fuel filler lid 23 is brought into the open state, the distal end 85*a* of the door hook 85 leaves the diagonal wall portion 83. Since the door motor 86 is OFF, the door hook 85 moves to the vehicle front side by the hook return spring 88, the distal end 85*a* comes to a position closer to the vehicle front side than the position A, and the output of the door opening/closing sensor 62 becomes the high voltage Hi. Therefore, the ECU 50 determines that the fuel filler lid 23 is in the open state from the door motor 86 OFF and the door opening/closing sensor 62 Hi. Moreover, if the fuel filler lid 23 is in the open state, the output of the door opening/closing sensor 62 maintains the high voltage Hi, and thus, if the output of the door opening/closing sensor 62 maintains the high voltage Hi for a predetermined time, the ECU 50 determines that the fuel filler lid 23 is in the open state.

As described above, the ECU 50 determines the open/closed state of the fuel filler lid 23 from the output of the door opening/closing sensor 62.

Moreover, even during the switching operation from closed to open of the door hook 85 or the opening operation of the fuel filler lid 23, the state can be determined from the operation of the door motor 86 and the output of the door opening/closing sensor 62. As described above, since the state during the switching operation from closed to open can be detected, operation confirmation of the lid lock mechanism 65 can be also performed, and by displaying that the fuel filler lid 23 is during the opening operation on the display 63, for example, even if the unlock of the fuel filler lid 23 takes some time, false recognition as a failure can be prevented.

In this embodiment, it is only necessary that the door opening/closing sensor 62 is capable of two types of output, that is, the high voltage Hi and the low voltage Lo, and thus, the door opening/closing sensor 62 can be an inexpensive one. Both the open state and the closed state of the fuel filler lid 23 can be detected by the one door opening/closing sensor 62.

Moreover, since the door opening/closing sensor 62 is to detect the protrusion position of the door hook 85, the lid lock mechanism 65 including the door hook 85 and the door motor 86 can be integrally unitized. As a result, there is no need to provide a new sensor or the like on a mounting portion of the fuel filler lid 23, and the fuel filler lid device 70 which can detect opening/closing of the fuel filler lid 23 can be made a compact configuration, and an increase in a cost can be suppressed.

Moreover, in this embodiment, by providing the door bracket 80 formed by bending a flat plate on the fuel filler lid 23, the left-and-right wall portion 81 for regulating the protrusion position of the door hook 85 at the intermediate position (first position) and the front-and-rear wall portion 82 for locking the fuel filler lid 23 in the closed state are provided on the fuel filler lid 23. Therefore, the left-and-right wall portion 81 and the door hook 85 can be formed easily, the number of components can be reduced, and the configuration can be simplified, and moreover, since the door hook 85 is locked by the front-and-rear wall portion 82 of the door bracket 80, the fuel filler lid can be reliably locked. Moreover, when the door hook 85 is locked, the distal end of the door hook 85 is pressed onto the left-and-right wall portion 81 of the door bracket 80 by the urging force of the hook return spring 88, and thus, the unlock by disturbance such as vibration can be prevented.

Subsequently, failure detection of the fuel filler lid device 70 will be explained.

In this embodiment, the ECU 50 detects a failure of the fuel filler lid device 70 from the output of the door opening/closing sensor 62 in the opening operation of the fuel filler lid 23.

Figure 8:
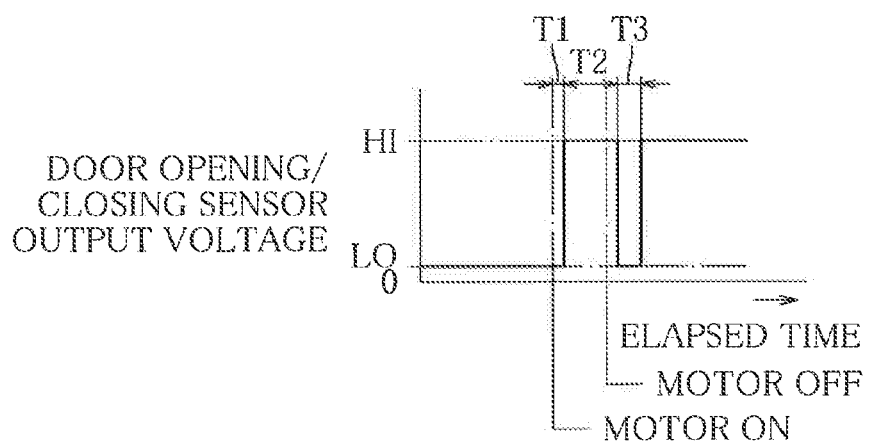
FIG. 8 is a time chart illustrating a change of an output of a door opening/closing sensor when the fuel filler lid is open in normal time.

FIG. 8 is a time chart illustrating a change of the output of the door opening/closing sensor 62 when the fuel filler lid 23 is open.

Figure 9:
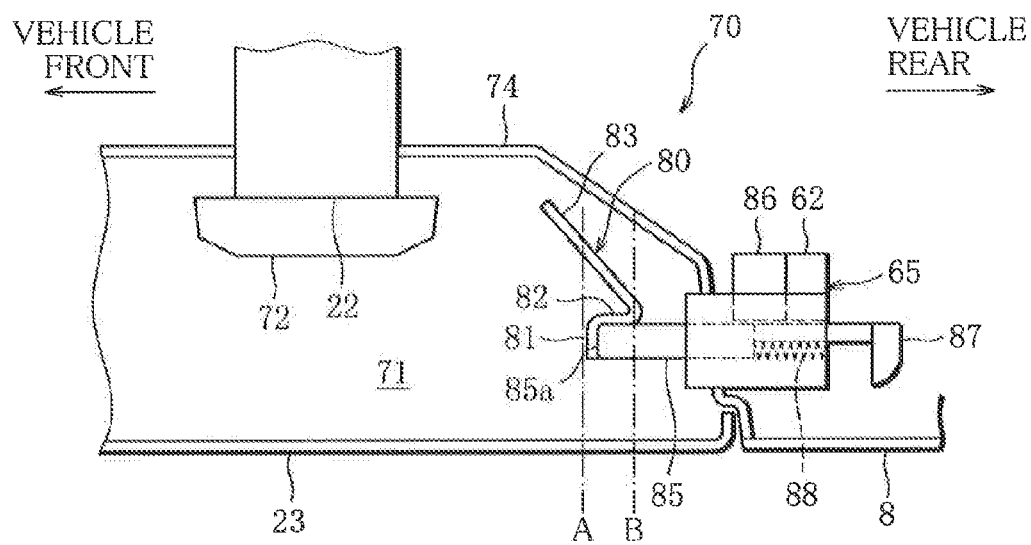
FIG. 9 is an explanatory view illustrating the moved state of the door hook and the fuel filler lid at a failure of a door motor.
Figure 10:
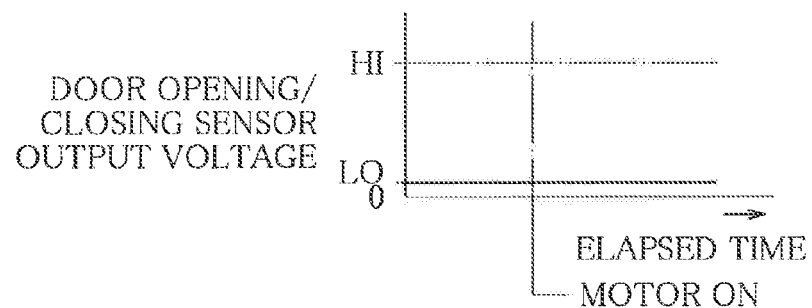
FIG. 10 is a time chart illustrating the change of the output of the door opening/closing sensor at a failure of the door motor.

FIG. 9 is a sectional view illustrating an operation state of the door hook 85 and the fuel filler lid 23 at a failure of the door motor 86. FIG. 10 is a time chart illustrating a change of the output of the door opening/closing sensor 62 at a failure of the door motor 86.

Figure 11:
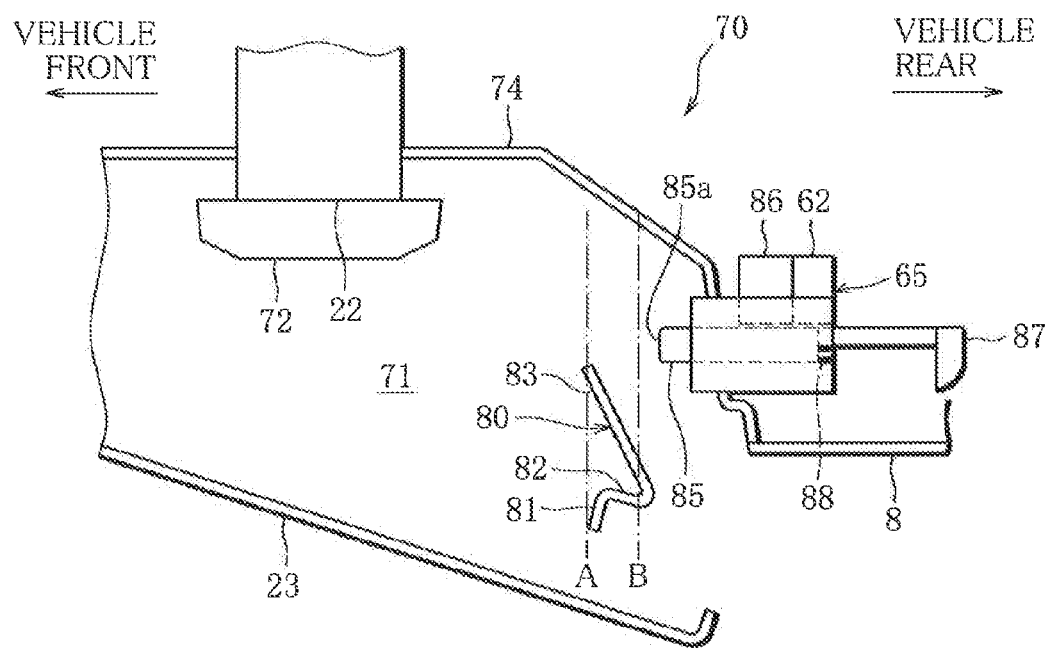
FIG. 11 is an explanatory view illustrating the moved state of the door hook and the fuel filler lid when a hook return spring is abnormal.
Figure 12:
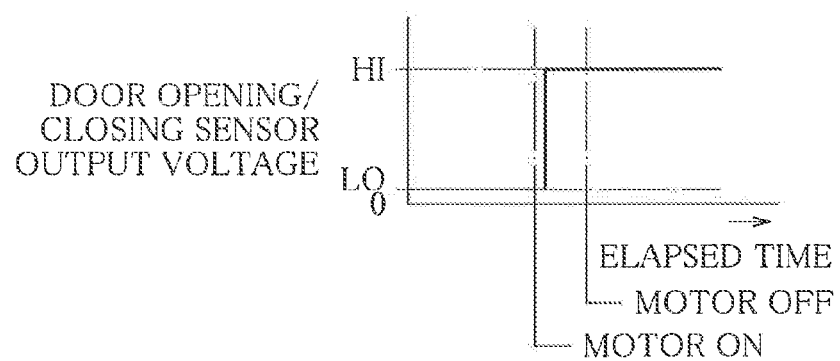
FIG. 12 is a time chart illustrating the change of the output of the door opening/closing sensor when the hook return spring is abnormal and the fuel filler lid is stuck closed.

FIG. 11 is a sectional view illustrating the operation state of the door hook 85 and the fuel filler lid 23 at an abnormality of the hook return spring 88. FIG. 12 is a time chart illustrating a change of the output of the door opening/closing sensor 62 at the abnormality of the hook return spring 88.

Figure 13:
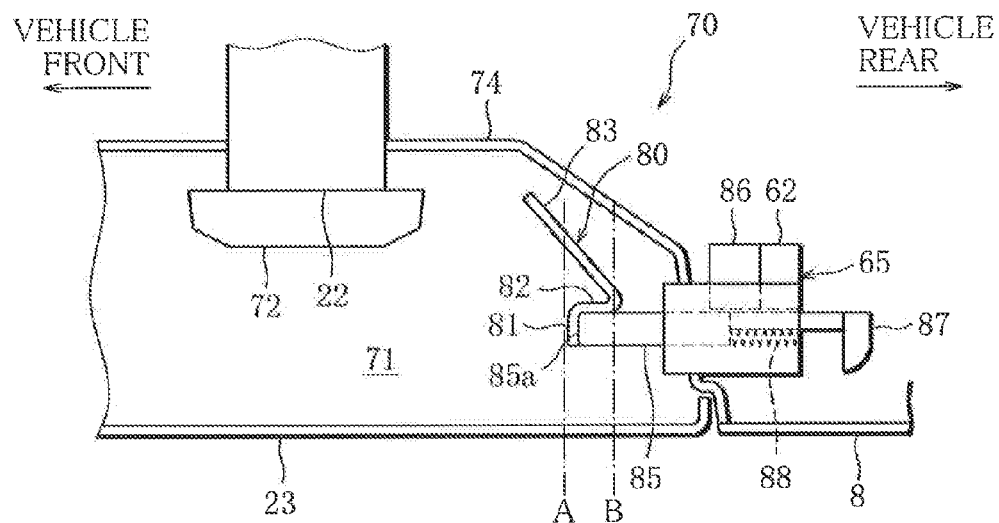
FIG. 13 is an explanatory view illustrating the moved state of the door hook and the fuel filler lid when the fuel filler lid is stuck closed.
Figure 14:
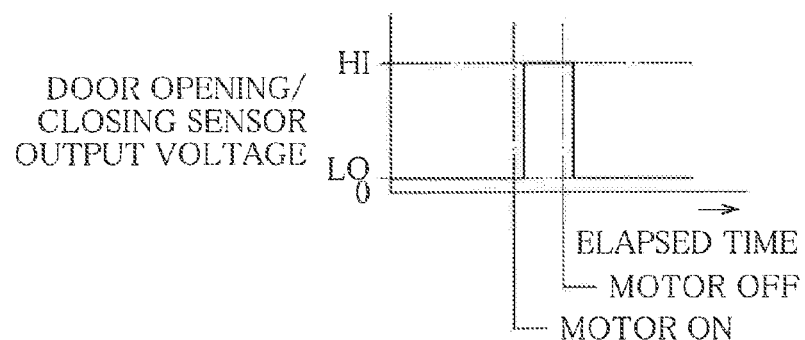
FIG. 14 is a time chart illustrating the change of the output of the door opening/closing sensor when the fuel filler lid is stuck closed and when being stuck during the opening operation.
Figure 15:
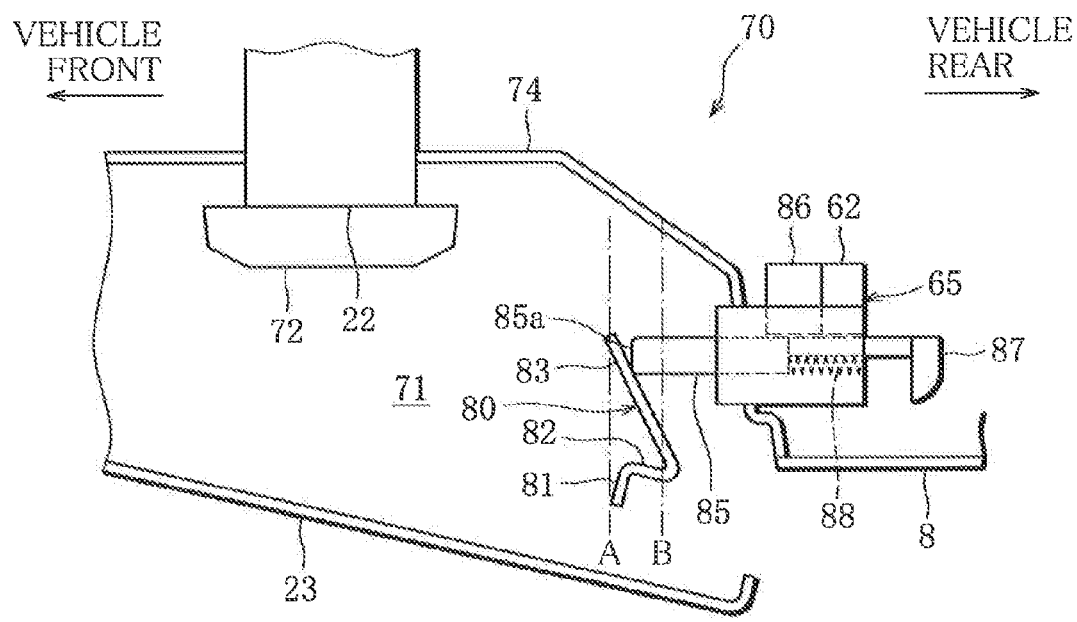
FIG. 15 is an explanatory view illustrating the moved state of the door hook and the fuel filler lid when being stuck of the fuel filler lid during the opening operation.

FIG. 13 is a sectional view illustrating the operation state of the door hook 85 and the fuel filler lid 23 when the fuel filler lid 23 is stuck closed. FIG. 14 is a time chart illustrating a change of the output of the door opening/closing sensor 62 when the fuel filler lid 23 is stuck closed or when being stuck during the opening operation. FIG. 15 is a sectional view illustrating the operation state of the door hook 85 and the fuel filler lid 23 when the fuel filler lid 23 is stuck during the opening operation.

In this embodiment, at a normal time, the output of the door opening/closing sensor 62 when the fuel filler lid 23 is opened/operated from the closed state changes in order from Lo to Hi, Lo, and Hi as illustrated in FIG. 8.

As illustrated in FIGS. 9 and 10, even if the door motor 86 is turned ON by operating the fuel filler lid switch 61 in order to open the fuel filler lid 23 from the closed state of the fuel filler lid 23, if the door motor 86 fails, the door hook 85 does not move to the rear than the position B. Therefore, even when the door motor 86 is turned ON by means of the operation of the fuel filler lid switch 61, if the output of the door opening/closing sensor 62 is maintained at the low voltage Lo, it can be determined that movement of the door hook 85 is impossible since the door motor 86 fails or rubbish or the like is bitten.

As illustrated in FIGS. 11 and 12, when the door motor 86 is kept ON for a predetermined time and the door hook 85 is operated in the anti-protrusion direction, the fuel filler lid 23 is brought into the open state. Then, when the door motor 86 is turned OFF, the door hook 85 protrudes by the hook return spring 88 at a normal time, the distal end 85a of the door hook 85 passes a regulated position between the position A and the position B and moves more to the front than the position A. However, if the hook return spring 88 has abnormality such as breakage or the like, the door hook 85 stays in the contracted state (position on the anti-protrusion side). Therefore, it can be determined that the hook return spring 88 is abnormal if, after the door motor 86 is turned OFF from ON, the output of the door opening/closing sensor 62 keeps at the high voltage Hi.

As illustrated in FIGS. 13 and 14, if the fuel filler lid 23 is stuck in the closed state due to freezing or abnormality of the spring 75 or the like, when the door motor 86 is turned ON in order to open the fuel filler lid 23, the door hook 85 is operated to the anti-protrusion direction, but the fuel filler lid 23 is not opened. Then, the door motor 86 is turned OFF, though the door hook 85 is extended/operated, the fuel filler lid 23 stays in the closed state, and thus, the door hook 85 is regulated at the position where protrusion is regulated by the left-and-right wall portion 81 of the door bracket 80. Therefore, even if the door motor 86 is turned ON, when the fuel filler lid 23 stays in the closed state and the output of the door opening/closing sensor 62 changes from the high voltage Hi to the low voltage Lo and maintained in that state, it can be determined that the fuel filler lid 23 is stuck in the closed state.

As illustrated in FIG. 15, if the door hook 85 and the door bracket 80 interfere with each other, and the fuel filler lid 23 is stuck during the opening operation, for example, the door hook 85 is brought into contact with the diagonal wall portion 83 of the door bracket 80, and protrusion is prevented. In this case, similarly to the case in which the fuel filler lid 23 is stuck in the closed state as illustrated in FIG. 14, the output of the door opening/closing sensor 62 changes. Therefore, if the door is somewhat opened by turning ON the door motor 86, and the output of the door opening/closing sensor 62 changes from the high voltage Hi to the low voltage Lo and maintained in that state, it can be determined that the fuel filler lid 23 is stuck in the closing operation.

Moreover, in the above-described embodiment, abnormality determination is made from presence of an output waveform of the door opening/closing sensor 62, but the abnormality determination can be also made from a length of the waveform of the output.

Figure 16:
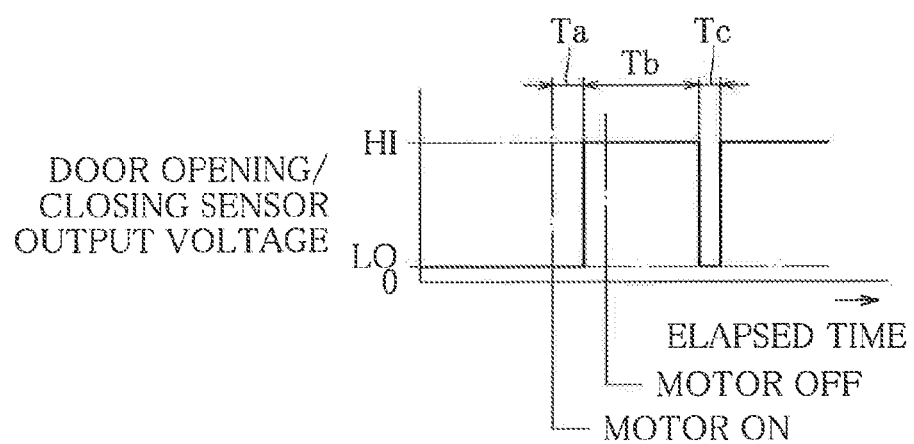
FIG. 16 is a time chart illustrating the change of the output of the door opening/closing sensor in other abnormal times.

FIG. 16 is a time chart illustrating an example of a change of the output of the door opening/closing sensor 62 in other abnormalities.

When the fuel filler lid switch 61 is pressed and the fuel filler lid 23 is opened, at a normal time, the output of the door opening/closing sensor 62 changes in order from Lo to Hi, Lo, and Hi, but since the door motor 86 is set to be ON for a certain period of time, each output time (T1, T2, T3) of the door opening/closing sensor 62 becomes substantially constant as illustrated in FIG. 8.

If time Ta from the door motor 86 ON until the output of the door opening/closing sensor 62 becomes the high voltage Hi, time Tb while the output of the door opening/closing sensor 62 is the high voltage Hi, and time Tc until the output of the door opening/closing sensor 62 changes from the high voltage Hi to the low voltage Lo and returns to the high voltage Hi are outside the time range in the normal time, respectively, the ECU 50 determines it to be abnormal as illustrated in FIG. 16.

For example, if the time Ta is longer than time T1 at the normal time, it can be determined that the door motor 86 deteriorates, while if the time Tb is longer than time T2 at the normal time, it can be determined that the hook return spring 88 deteriorates and the spring constant lowers. Moreover, if the time Ta, the time Tb, and the time Tc are longer than the time T1, T2, and T3 at the normal time, it can be determined that sliding resistance of the door hook 85 is large.

As described above, abnormality such as a failure of the door motor 86, abnormality of the hook return spring 88, stuck of the fuel filler lid 23 and the like can be determined on the basis of the output of the door opening/closing sensor 62 in the opening operation of the fuel filler lid 23. The door opening/closing sensor 62 is a sensor used for detecting opening/closing of the fuel filler lid 23, and abnormality detection of the fuel filler lid device 70 can be made with a simple configuration without adding other sensors or the like.

Subsequently, operation determination of the emergency lever 87 will be explained.

Figure 17:
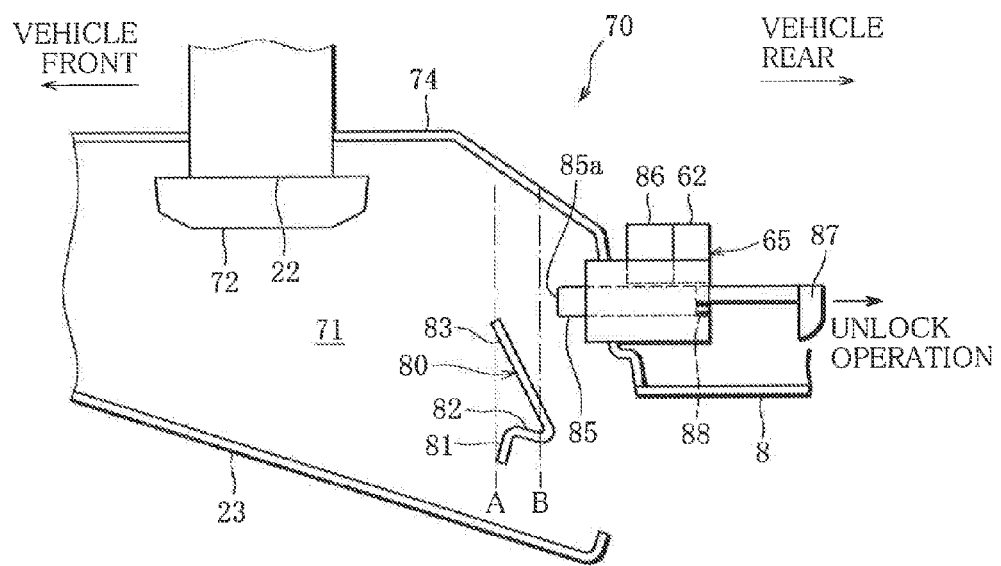
FIG. 17 is an explanatory view illustrating the moved state of the door hook and the fuel filler lid when the fuel filler lid is opened by an operation of an emergency lever.
Figure 18:
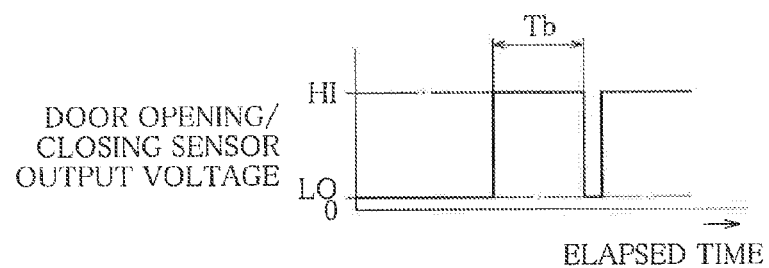
FIG. 18 is a time chart illustrating the change of the output of the door opening/closing sensor when the fuel filler lid is opened by the operation of the emergency lever.

FIG. 17 is an explanatory view illustrating a moved state of the door hook 85 and the fuel filler lid 23 when the fuel filler lid 23 is unlocked by the operation of the emergency lever 87. FIG. 18 is a time chart illustrating a change of the output of the door opening/closing sensor 62 when the fuel filler lid 23 is unlocked by the operation of the emergency lever 87.

When the fuel filler lid 23 is opened/operated by operating the fuel filler lid switch 61, as illustrated in FIG. 8, the output of the door opening/closing sensor 62 changes in order from Lo to Hi, Lo, and Hi, but at this time, since the duration time T2 (first predetermined time) of the high voltage Hi when the low voltage Lo at the beginning becomes the high voltage Hi becomes substantially constant time since the door motor 86 operates for a certain period of time determined in advance.

Even when the door motor 86 is turned ON by operating the fuel filler lid switch 61 in order to unlock the fuel filler lid 23, if the door hook 85 is not moved due to a failure of the door motor 86, for example, and the fuel filler lid 23 is not opened, an operator or the like operates the emergency lever 87 and manually unlocks the fuel filler lid 23. At this time, the operation of the emergency lever 87 is performed until the fuel filler lid 23 is manually opened, and thus, the operation time becomes longer than the normal operation time of the door motor 86.

Thus, the ECU 50 can determine that the fuel filler lid 23 is unlocked by the emergency lever 87 and opened/operated if the output of the door opening/closing sensor 62 becomes the high voltage Hi from the low voltage Lo at opening of the fuel filler lid 23 and by measuring the time Tb when the output becomes the high voltage Hi, and if this exceeds the operation time T2 by the door motor 86.

As described above, the fact that the fuel filler lid 23 is opened by the operation of the emergency lever 87 can be detected by the output time of the output of the door opening/closing sensor 62.

If the output of the door opening/closing sensor 62 maintains the high voltage Hi for a predetermined time (second predetermined time) or more without operating the fuel filler lid switch 61, it can be estimated that the fuel filler lid 23 is opened against the will of the operator or the like or the fuel filler lid 23 is left in the open state. Thus, the ECU 50 has a function of displaying an alarm on the display 63 so that the fuel filler lid 23 is to be closed if the output of the door opening/closing sensor 62 maintains the high voltage Hi for a predetermined time (second predetermined time) or more without operating the fuel filler lid switch 61. Then, in this embodiment, if, moreover, it is determined that the fuel filler lid 23 is opened/operated by the operation of the emergency lever 87 as above, this alarm display is regulated not to be made. As a result, the operator or the like can be prevented from being confused by the alarm prompting closing of the fuel filler lid 23 even though the fuel filler lid 23 is opened by the operation of the emergency lever.

The embodiment of the invention has been explained but the mode of the present invention is not limited to the above-described embodiment.

For example, in the above-described embodiment, the position of the door hook 85 is detected by the door opening/closing sensor 62 constituted integrally with the lid lock mechanism 65, but the position of the distal end 85a of the door hook 85 may be detected by a detection portion (a proximity sensor, a photoelectric sensor, detection from an image and the like) provided separately from the lid lock mechanism 65.

Moreover, in the above-described embodiment, the invention of the present application is applied to the fuel filler lid device of a sealed tank, but the invention of the present application may be applied to a fuel filler lid device of a tank not sealed.

What is claimed is:

1. A fuel filler lid device comprising:
a fuel filler lid configured to open/close a fuel filler of a fuel tank of a vehicle;
a locking portion provided on a vehicle body and movable in a direction to protrude to a side of the fuel filler lid from the vehicle body;
a movable portion configured to make the locking portion movable;
a regulation portion provided on the fuel filler lid and regulating a protrusion position of the locking portion at a first position with the fuel filler lid at a closed position;
a detection portion configured to detect the protrusion position of the locking portion; and
a determination portion configured to determine that the fuel filler lid is in a closed state if the detection portion detects that the locking portion is at the first position and configured to determine that the fuel filler lid is in the open state if it is detected that the locking portion is at a second position protruding more than the first position, and configured to determine that the fuel filler lid is during a switching operation from the closed state to the open state if the detection portion detects that the locking portion is at a third protruding position with a protrusion amount shorter than the first position.

2. The fuel filler lid device according to claim 1, wherein the fuel filler lid is provided with a bracket that includes, a bent portion, and
the regulation portion, the regulation portion regulates the locking portion by the locking portion brought into contact with the bent portion and locks the fuel filler lid in a closed state.

3. The fuel filler lid device according to claim 1, wherein the detection portion outputs a first output at the first position and outputs a second output at the second position or the third position; and
the second output is higher than the first output.

4. The fuel filler lid device according to claim 1, wherein the fuel filler lid device includes a first urging portion urging the fuel filler lid to an open direction; and
the movable portion has a second urging portion urging the locking portion in a protrusion direction.

5. The fuel filler lid device according to claim 1, wherein the movable portion has an actuator configured to operate the locking portion in an anti-protrusion direction against an urging force of the second urging portion; and
the determination portion determines an open/closed state of the fuel filler lid on the basis of an output of the detection portion and an operation of the actuator.

6. The fuel filler lid device according to claim 1, wherein the fuel tank includes a sealing valve configured to seal the fuel tank; and
an unlock control portion configured such that, when an unlock operation portion is operated, the sealing valve is opened/operated and a pressure in the fuel tank is reduced to a predetermined value or less, and the locking portion is operated in the anti-protrusion direction so as to unlock the fuel filler lid is provided.

7. A fuel filler lid device comprising:
a fuel filler lid configured to open/close a fuel filler of a fuel tank of a vehicle;
a locking portion provided on a vehicle body and capable of protrusion and movement;
a movable portion configured to make the locking portion movable;
a regulation portion provided on the fuel filler lid and regulating a protrusion position of the locking portion at a first position with the fuel filler lid at a closed position and locking by locking the fuel filler lid at the closed position;
an unlock control portion configured to operate the movable portion by an operation of an unlock operation portion and moving the locking portion in an anti-protrusion direction from the first position so as to unlock the fuel filler lid;
a detection portion configured to detect a position of the locking portion; and
an abnormality determination portion configured to determine abnormality on the basis of a change of a detection result of the detection portion after the operation of the unlock operation portion.

8. The fuel filler lid device according to claim 7, wherein the detection portion outputs a first output if the locking portion is at the first position and outputs a second output if the locking portion is at a second position protruding more than the first position or a third position on an anti-protrusion side of the first position; and the abnormality determination portion determines a failure of the movable portion if the output from the detection portion maintains the first output even though control of an operation of the movable portion is started by an operation of the unlock operation portion.

9. The fuel filler lid device according to claim 8, wherein the movable portion has a second urging portion urging the locking portion to a protrusion direction; and the abnormality determination portion determines abnormality of the second urging portion if the output from the detection portion becomes the second output from the first output and is maintained at the second output when the movable portion is operated by the operation of the unlock operation portion.

10. The fuel filler lid device according to claim 8, wherein the movable portion has a second urging portion urging the locking portion to a protrusion direction and an actuator configured to operate the locking portion in an anti-protrusion direction against an urging force of the second urging portion; and the abnormality determination portion determines that the fuel filler lid is in a stuck state if the output from the detection portion is outputted in order from the first output to the second output and the first output and is maintained at the first output when the actuator is operated by an operation of the unlock operation portion.

11. The fuel filler lid device according to claim 7, wherein the abnormality determination portion makes abnormality determination on the basis of output time of an output from the detection portion when the operation of the movable portion is controlled by the operation of the unlock operation portion.

12. The fuel filler lid device according to claim 7, wherein the fuel tank is a sealed tank; and the unlock control portion reduces a pressure in the fuel tank to a predetermined value or less when the unlock operation portion is operated and then, unlocks the fuel filler lid by operating the movable portion so that the locking portion is moved to an anti-protrusion direction.

13. A fuel filler lid device comprising:

a fuel filler lid configured to open/close a fuel filler of a fuel tank of a vehicle;

a locking portion provided on a vehicle body and movable in a direction protruding from the vehicle body;

a regulation portion provided on the fuel filler lid and regulating a protrusion position of the locking portion at a first position with the fuel filler lid at a closed position and locking the fuel filler lid by locking the same at the closed position;

a forced unlock portion configured to unlock the fuel filler lid by forcedly moving the locking portion manually;

a detection portion configured to detect a position of the locking portion and configured to output the detection result; and a forced unlock determination portion determining that the fuel filler lid is unlocked by the forced unlock portion on the basis of output time of an output from the detection portion, wherein the detection portion outputs a first output if the locking portion is at the first position regulated by the regulation portion and outputs a second output if the locking portion is at a third position closer to an anti-protrusion side than the first position; and wherein the forced unlock determination portion determines that the fuel filler lid is unlocked by the forced unlock portion if output time of the second output after the first output outputted from the detection portion exceeds a first predetermined time when the fuel filler lid is opened.

14. The fuel filler lid device according to claim 13, wherein the fuel filler lid device includes:

an unlock control portion configured to unlock the fuel filler lid by operating the locking portion in an anti-protrusion direction from the first position by an operation of an unlock operation portion; and an alarm portion configured to make an alarm if the detection portion outputs the second output for a second predetermined time or more even though the unlock operation portion is not operated.

15. The fuel filler lid device according to claim 14, wherein the fuel filler lid device includes:

an alarm regulation portion configured to regulate an operation of the alarm portion if it is determined by the forced unlock determination portion that the fuel filler lid is unlocked by the forced unlock portion.

16. The fuel filler lid device according to claim 14, wherein the fuel tank is a sealed tank;

the fuel filler lid device includes a movable portion configured to make the locking portion movable; and the unlock control portion unlocks the fuel filler lid by reducing a pressure in the fuel tank to a predetermined value or less and then, by operating the movable portion so as to move the locking portion to an anti-protrusion direction if the unlock operation portion is operated.

\* \* \* \* \*